US008780093B2

(12) United States Patent
Chen et al.

(10) Patent No.: US 8,780,093 B2
(45) **Date of Patent: *Jul. 15, 2014**

(54) METHOD FOR TRANSMITTING IMAGE DATA THROUGH RSDS TRANSMISSION INTERFACES

(75) Inventors: Ying-Lieh Chen, Sinshih Township, Tainan County (TW); Wen-Teng Fan, Sinshih Township, Tainan County (TW); Chao-Ching Chi, Sinshih Township, Tainan County (TW)

(73) Assignee: Himax Technologies Limited (TW)

( * ) Notice: Subject to any disclaimer, the term of this patent is extended or adjusted under 35 U.S.C. 154(b) by 757 days.

This patent is subject to a terminal disclaimer.

(21) Appl. No.: 12/411,172

(22) Filed: Mar. 25, 2009

(65) Prior Publication Data

US 2010/0245368 A1 Sep. 30, 2010

(51) Int. Cl.
*G06F 3/038* (2013.01)

(52) U.S. Cl.
USPC .......... 345/204

(58) Field of Classification Search
USPC .......... 345/87–104, 204–215, 690–699
See application file for complete search history.

(56) References Cited

U.S. PATENT DOCUMENTS

| | | | | |
|---|---|---|---|---|
| 5,301,272 | A * | 4/1994 | Atkins | 345/502 |
| 6,646,684 | B1 * | 11/2003 | Kondo et al. | 348/447 |
| 6,742,098 | B1 * | 5/2004 | Halbert et al. | 711/172 |
| 7,030,852 | B2 * | 4/2006 | Ito et al. | 345/103 |
| 7,288,972 | B1 * | 10/2007 | Esposito et al. | 327/105 |
| 7,336,253 | B2 * | 2/2008 | Kim | 345/98 |
| 7,969,427 | B2 | 6/2011 | Katagawa | 345/204 |
| 2004/0227717 | A1 | 11/2004 | Yeh | 345/100 |
| 2007/0176881 | A1 * | 8/2007 | Lin | 345/100 |
| 2008/0030453 | A1 * | 2/2008 | Chen et al. | 345/98 |
| 2009/0284455 | A1 * | 11/2009 | Jung | 345/87 |

FOREIGN PATENT DOCUMENTS

TW 200729116 1/2006

* cited by examiner

*Primary Examiner* — Kee M Tung
*Assistant Examiner* — William Beutel
(74) *Attorney, Agent, or Firm* — Hayes Soloway P.C.

(57) ABSTRACT

A method for transmitting image data in a display is provided. The method includes the steps of: sending first pixel data through a first bus to a source driver; sending second pixel data through a second bus to the source driver; reorganizing the first pixel data and the second pixel data in the source driver; and generating third pixel data according to the reorganization of the first pixel data and the second pixel data for channels in the source driver. A display is also disclosed herein.

9 Claims, 2 Drawing Sheets

METHOD FOR TRANSMITTING IMAGE DATA THROUGH RSDS TRANSMISSION INTERFACES

BACKGROUND

1. Field of Invention

The present invention relates to a method for transmitting image data. More particularly, the present invention relates to a method for transmitting image data through reduced swing differential signaling (RSDS) transmission interfaces to a driver in a display.

2. Description of Related Art

Reduced swing differential signaling (RSDS) is a differential interface with a nominal signal swing of 200 mV. It defines the output characteristics of a transmitter and the inputs of a receiver along with the protocol for a chip-to-chip interface between timing controllers and drivers. It also retains many benefits such as high noise immunity, high data rate, low EMI characteristics and low power dissipation.

However, whenever image data including a plurality of pixel values, each of which is represented by a plurality of bits, is transmitted through the RSDS transmission interface from the timing controller to the driver in a display, the image data are usually transmitted bit by bit from a single timing controller. As a result, the image data transmission between the timing controller and the driver is usually very slow and inefficient. Thus, the image data transmission cannot be performed efficiently, and the operation speed of the display cannot be increased, either.

SUMMARY

In accordance with one embodiment of the present invention, a display is provided. The display includes a first timing controller, a second timing controller and a source driver. The first timing controller includes a first transmitter connected to a first bus, for sending first pixel data through the first bus. The second timing controller includes a second transmitter connected to a second bus, for sending second pixel data through the second bus. The source driver includes a receiver and plural channels, in which the receiver is connected to the first bus and the second bus, for receiving the first pixel data and the second pixel data, and reorganizes the first pixel data and the second pixel data to generate third pixel data, based on a bus mode, for the channels.

In accordance with another embodiment of the present invention, a method for transmitting image data in a display is provided. The method includes the steps of: sending first pixel data through a first bus to a source driver; sending second pixel data through a second bus to the source driver; reorganizing the first pixel data and the second pixel data in the source driver; and generating third pixel data according to the reorganization of the first pixel data and the second pixel data for channels in the source driver.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
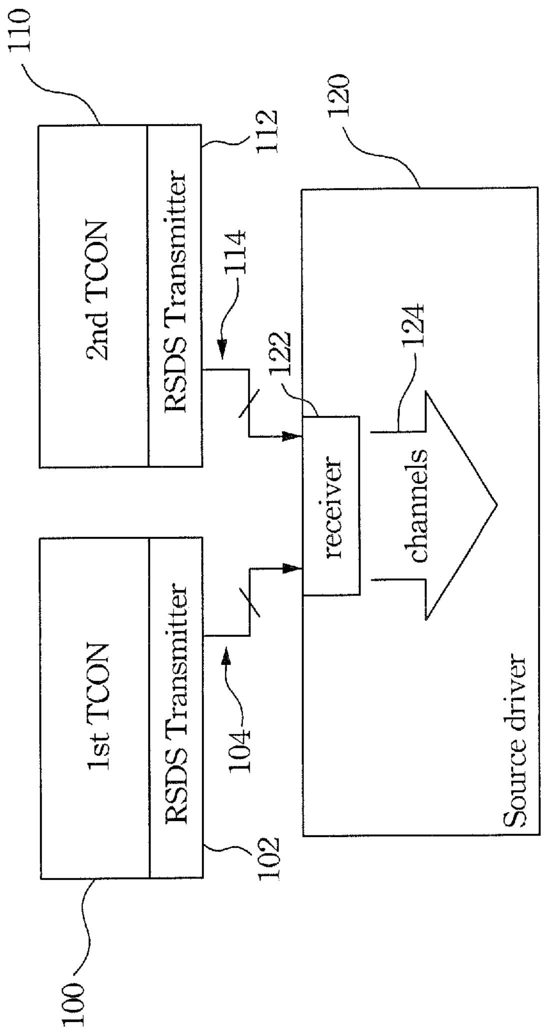
FIG. 1 illustrates a general block diagram of a display according to one embodiment of the present invention.

FIG. 1 illustrates a general block diagram of a display according to one embodiment of the present invention. The display includes a first timing controller 100, a second timing controller 110, and a source driver 120. The first timing controller 100 includes a transmitter 102, which is for example a reduced swing differential signaling (RSDS). The second timing controller 110 includes a transmitter 112, which is a reduced swing differential signaling (RSDS) transmitter for example. The transmitters 102 and 112 are respectively connected to buses 104 and 114, for separately sending first pixel data and second pixel data through the buses 104 and 114 to the source driver 120.

The source driver 120 includes a receiver 122 and plural channels 124, in which the receiver 122 can be embodied as a line buffer. The receiver 122 is connected to the buses 104 and 114 and receives the first pixel data and the second pixel data respectively from the first timing controller 100 and the second timing controller 110. The first pixel data include data A0, A1, A2, A3, and etc. One data, for example A0, corresponds to a pixel of a display. The second pixel data include data B0, B1, B2, B3, and etc.

Further, the receiver 122 reorganizes the first pixel data and the second pixel data to generate third pixel data, based on a bus mode, for the channels 124. In one embodiment, the receiver 122 alternatively selects the data in the first pixel data and the data in the second pixel data to be outputted as the third pixel data for the channels 124.

Figure 2:
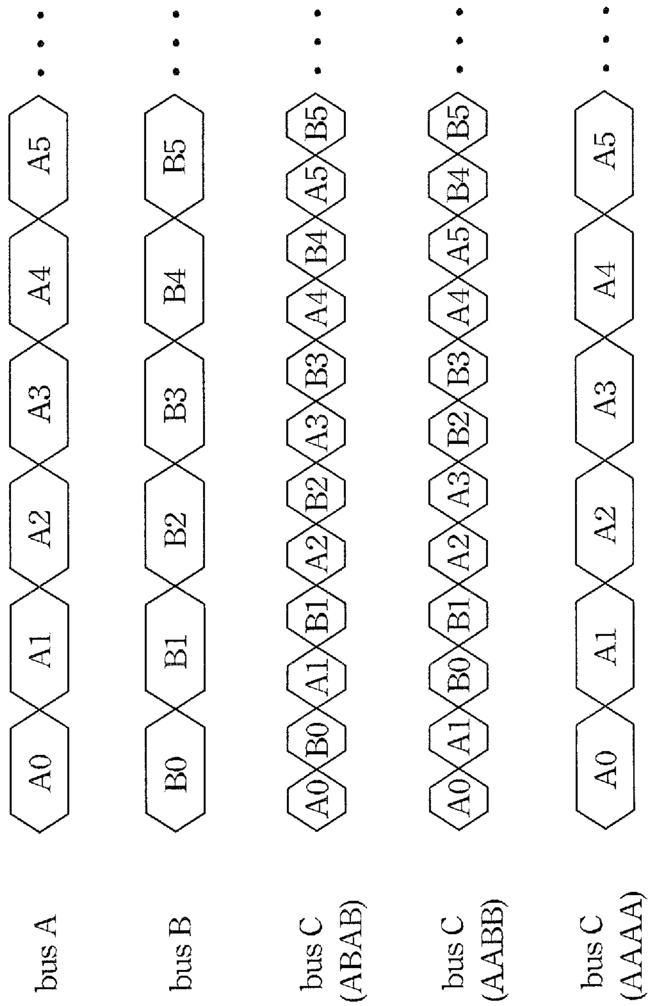
FIG. 2 illustrates a timing diagram of data transmission in FIG. 1.

FIG. 2 illustrates a timing diagram of data transmission in FIG. 1. Hereinafter, bus A represents the bus 104 for transmitting the first pixel data (e.g. A0, A1, A2, A3, . . . ) from the first timing controller 100, bus B represents the bus 114 for transmitting the second pixel data (e.g. B0, B1, B2, B3, . . . ) from the second timing controller 110, and bus C represents the bus (not shown) for the receiver 122 to transmit the third pixel data to the channels 124.

First, if an enable input/output signal (EIO) is activated, the first pixel data A0, A1, A2, A3, . . . and the second pixel data B0, B1, B2, B3, . . . are sent respectively from the first timing controller 100 and the second timing controller 110 to the receiver 122 of the source driver 120. Then, the first pixel data A0, A1, A2, A3, . . . and the second pixel data B0, B1, B2, B3, . . . are reorganized by the receiver 122 of the source driver 120, and the third pixel data are generated according to the reorganization of the first pixel data A0, A1, A2, A3, . . . and the second pixel data B0, B1, B2, B3, . . . . In the present embodiment, the data transmission can be separately performed under three kinds of bus mode, i.e. ABAB, AABB and AAAA mode. If the bus mode is ABAB mode, the receiver 122 alternatively selects one of the first pixel data A0, A1, A2, A3, . . . and one of the second pixel data B0, B1, B2, B3, . . . to be outputted as the third pixel data. Specifically, the first pixel data A0, A1, A2, A3, . . . and the second pixel data B0, B1, B2, B3, . . . are reorganized to be the third pixel data A0, B0, A1, B1, A2, B2, A3, B3, . . . for the bus C to transmit. In one embodiment, the first timing controller 100 and the second timing controller 110 both send the pixel data at a first clock rate, and the receiver 122 outputs the third pixel data for the channels at a second clock rate twice the first clock rate.

In another aspect, if the bus mode is ABAB mode, the receiver 122 alternatively selects two of the first pixel data A0, A1, A2, A3, . . . and two of the second pixel data B0, B1, B2, B3, . . . to be outputted as the third pixel data. Specifically, the first pixel data A0, A1, A2, A3, . . . and the second pixel data B0, B1, B2, B3, . . . are reorganized to be the third pixel data A0, A1, B0, B1, A2, A3, B2, B3, . . . for the bus C to transmit.

In yet another aspect, if the bus mode is AAAA mode, the second timing controller 110 is disabled and only the first timing controller 100 sends the first pixel data A0, A1, A2, A3, . . . to the receiver 122. At that moment, the bus C only transmits the pixel data A0, A1, A2, A3, and etc.

For the foregoing embodiment of the present invention, the method for transmitting the image data through the RSDS transmission interfaces can be provided to improve the efficiency and speed of the image data transmission, so as to further improve the operation speed of the display.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A display comprising:

a first timing controller comprising a first transmitter connected to a first bus, for sending first pixel data through the first bus at a first clock rate;

a second timing controller comprising a second transmitter connected to a second bus at the first clock rate, for sending second pixel data through the second bus, wherein each of the first pixel data and the second pixel data corresponds to a pixel value of a pixel of the display, and each of the first pixel data and the second pixel data comprises a plurality of bits; and a source driver comprising a receiver and plural channels, the receiver being connected to the first bus and the second bus, for receiving the first pixel data and the second pixel data, and reorganizing the first pixel data and the second pixel data to generate third pixel data, based on a bus mode, for the channels, wherein while the bus mode is a third mode, the receiver is configured to reorganize the first pixel data and the second pixel data by alternatively selecting two successively transmitted first pixel data of the first pixel data sent through the first bus and selecting two successively transmitted second pixel data of the second pixel data sent through the second bus to be outputted as the third pixel data, wherein the two successively transmitted first pixel data are followed by the two successively transmitted second pixel data, and the receiver outputs the third pixel data at a second clock rate twice the first clock rate.

2. The display of claim 1, wherein while the bus mode is a first mode, the first timing controller sends the first pixel data, and the second timing controller is disabled.

3. The display of claim 1, wherein while the bus mode is a second mode, the receiver alternatively selects one of the first pixel data and one of the second pixel data to be outputted as the third pixel data.

4. The display of claim 1, wherein the first pixel data and the second pixel data are sent if an enable input/output signal is activated.

5. The display of claim 1, wherein the first transmitter and the second transmitter both are reduced swing differential signaling (RSDS) transmitters.

6. A method for transmitting image data in a display, comprising the steps of:

providing the display comprising a first transmitter, a second transmitter, a receiver, a first bus, a second bus, and a source driver;

the first transmitter sending first pixel data through the first bus to the source driver;

the second transmitter sending second pixel data through the second bus to the source driver, wherein each of the first pixel data and the second pixel data corresponds to a pixel value of a pixel of the display, and each of the first pixel data and the second pixel data comprises a plurality of bits and the first pixel data and the second pixel data are sent at a first clock rate;

the receiver reorganizing the first pixel data and the second pixel data in the source driver, wherein the step of reorganizing the first pixel data and the second pixel data further comprises:

the receiver alternatively selecting two successively transmitted first pixel data of the first pixel data sent through the first bus and selecting two successively transmitted second pixel data of the second pixel data sent through the second bus to generate the third pixel data based on a first mode, wherein the two successively transmitted first pixel data are followed by the two successively transmitted second pixel data; and the receiver generating third pixel data according to the reorganization of the first pixel data and the second pixel data for channels in the source driver, wherein the third pixel data are transmitted in the source driver at a second clock rate twice the first clock rate.

7. The method of claim 6, wherein the step of reorganizing the first pixel data and the second pixel data further comprises:

the receiver alternatively selecting one of the first pixel data and one of the second pixel data to generate the third pixel data based on a second mode.

8. The method of claim 6, wherein the first pixel data and the second pixel data are sent if an enable input/output signal is activated.

9. The method of claim 6, wherein the first pixel data and the second pixel data are sent through reduced swing differential signaling (RSDS) buses.

* * * * *